June 3, 1958  H. W. ROCKWELL  2,837,107
MULTIPLE SPEED HYDRAULIC VALVE
Filed Dec. 27, 1955  3 Sheets-Sheet 1
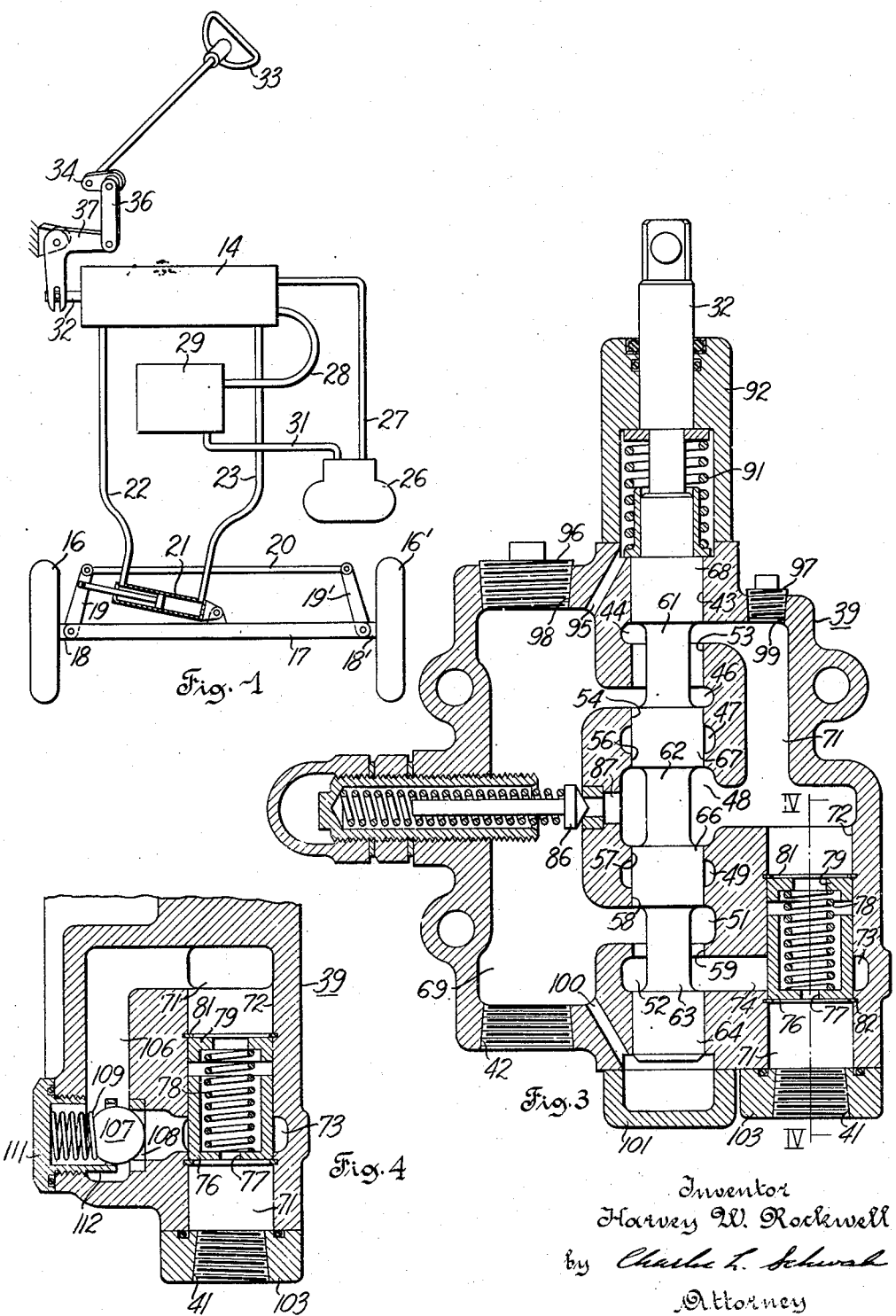
Inventor
Harvey W. Rockwell
by Charles L. Schwab
Attorney

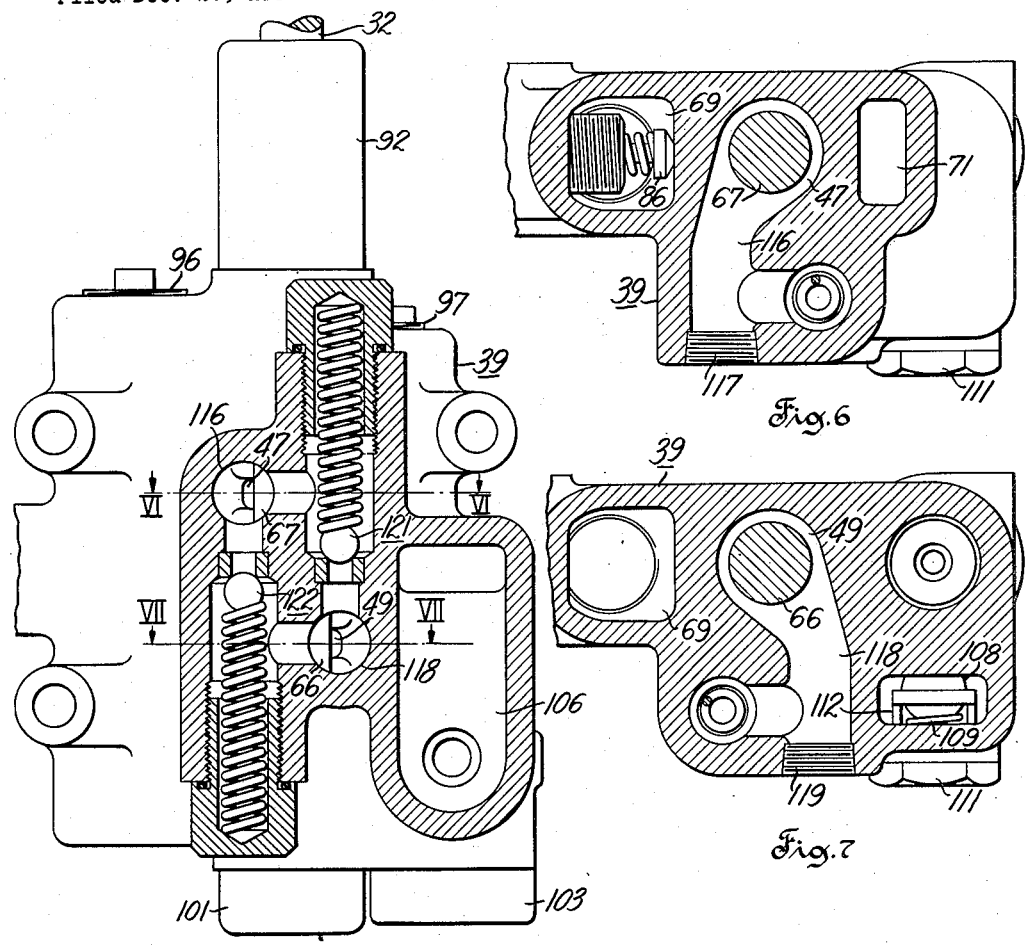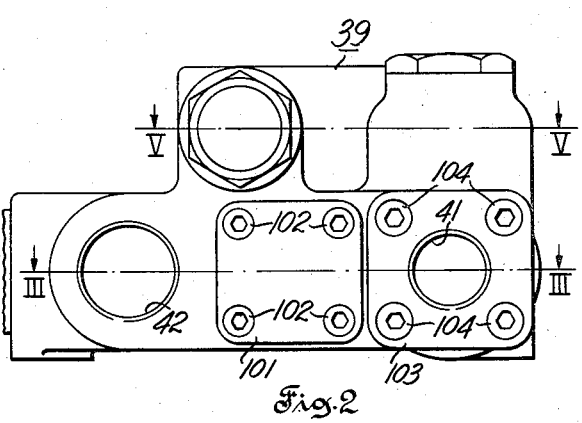

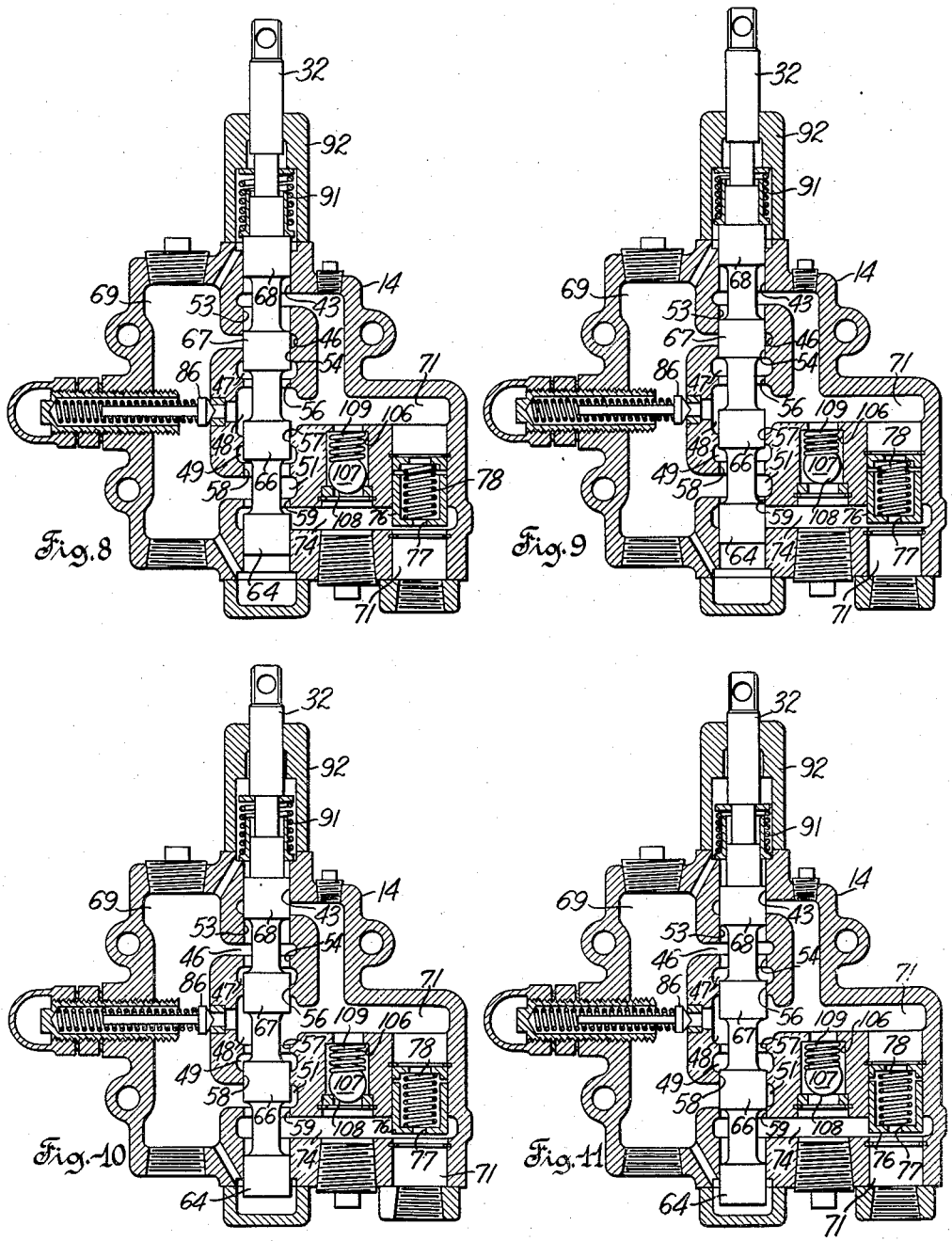

United States Patent Office 2,837,107
Patented June 3, 1958

2,837,107

MULTIPLE SPEED HYDRAULIC VALVE

Harvey W. Rockwell, Cedar Rapids, Iowa, assignor to Allis-Chalmers Manufacturing Company, Milwaukee, Wis.

Application December 27, 1955, Serial No. 555,612

7 Claims. (Cl. 137—106)

This invention relates to a hydraulic power system in which a fluid controlled device is selectively operated at a plurality of speeds and more particularly relates to the control mechanism for effecting multiple speed operation of the fluid controlled device.

Multiple speed operation is desirable in a number of fluid actuated devices, one such device being a hydraulic power steering mechanism for motor vehicles. Heretofore it has been suggested that a plurality of pumps be used to selectively obtain multiple speed operation of hydraulic power operated devices. However, from the standpoint of economy it is desirable to provide multiple speed operation through use of a single pump.

It is an object of this invention to provide an improved fluid control unit for operating a fluid controlled device at a plurality of speeds.

It is a further object to provide a multiple speed hydraulic control unit of the hereinbefore outlined character wherein only a single pump is required.

It is a further object to provide a control unit of the hereinbefore outlined character wherein a slow speed operation of the hydraulically controlled device is effected by bypassing a portion of the pressure fluid and wherein a high speed operation of the hydraulically controlled device is effected by recombining a portion of the bypassed fluid.

It is a further object of this invention to provide an improved fluid control unit of the hereinbefore outlined character which is economical to manufacture, is compact and gives satisfactory service.

These and other objects and advantages of this invention will be evident when the following description is read in conjunction with the accompanying drawings, in which:

Fig. 1 is a schematic showing of a power steering mechanism incorporating the fluid directing valve unit of this invention;

Fig. 2 is an end view of the fluid directing valve unit;

Fig. 3 is a section view of the valve unit taken on line III—III in Fig. 2;

Fig. 4 is a section view of the valve unit taken on line IV—IV in Fig. 3;

Fig. 5 is a section view of the valve unit taken on line V—V in Fig. 2;

Fig. 6 is a section view of the valve unit taken on line VI—VI in Fig. 5;

Fig. 7 is a section view of the valve unit taken on line VII—VII in Fig. 5;

Fig. 8 is a schematic view showing the valve unit adjusted for slow speed fluid output from a first output port;

Fig. 9 is a schematic view showing the valve unit adjusted for high speed fluid output from the first output port;

Fig. 10 is a schematic view showing the valve unit adjusted for slow speed fluid output from a second output port; and Fig. 11 is a schematic view showing the valve unit adjusted for high speed fluid output from the second output port.

Fig. 1 shows the valve unit 14 of this invention incorporated in a steering mechanism, shown schematically. A pair of steerable wheels 16, 16' are mounted on an axle tree 17 by a pair of spindles 18, 18'. The spindles 18, 18' are pivotally connected to the axle tree 17 on vertical axes and have steering arms 19, 19' which are interconnected by a stabilizer link 20. A double acting hydraulic motor in the form of a ram 21 has its cylinder pivotally connected to the axle tree and has its piston rod pivotally connected to steering arm 19. The hydraulic ram or motor 21 is double acting and has the opposite ends of its cylinder connected to fluid supplying conduits 22 and 23. The motor supplying conduits 22 and 23 are in turn connected to a pair of fluid output ports in a fluid directing valve unit 14. Fluid is supplied to the valve unit 14 by a gear type pump 26 through a pressure fluid input conduit 27. An exhaust conduit 28 connects the valve unit 14 with a reservoir 29 and a pump input conduit 31 connects the reservoir to the pump 26. A valve spool 32 controls the direction of the fluid through the valve control unit 14 and this valve spool 32 is shifted by manual actuation of a steering wheel 33 through linkage members 34, 36 and 37.

Referring to Figs. 2 and 3, the valve spool 32 is reciprocably mounted in a valve housing 39. The pressure fluid input conduit 27 is connected to an input port 41 and the exhaust conduit 28 is connected to the exhaust port 42 in the valve housing. The bore 43, in which the valve spool is fitted, is interrupted by recesses 44, 46, 47, 48, 49, 51 and 52 so as to form lands 53, 54, 56, 57, 58 and 59. The valve spool 32 has reduced portions 61, 62 and 63 formed therein leaving collar portions 64, 66, 67 and 68. Recesses 46 and 51 are connected to an exhaust passage 69 which is in communication with exhaust port 42. Grooves 44 and 48 are connected in fluid communication with an input passage 71 having a cylindrical portion 72 communicating with input port 41. A recess 73 is formed in the cylindrical portion 72 of the input passage 71 and this recessed portion 73 is connected in fluid communication with the exhaust passage 69 by a secondary passage 74 through recess 52, land 59 and recess 51.

A pressure sensitive valve element in the form of a piston valve 76 is reciprocably mounted in the cylindrical portion 72 of the input passage 71. This piston valve 76 serves to restrict the flow of fluid in the inlet passage by presenting a flow restricting orifice 77 and the cylindrical walls of the piston valve serve to block the flow of fluid from the input passage 71 to the secondary passage 74 except when the output of the pump 26 exceeds a predetermined amount. The piston valve 76 is spring biased toward a seated position, in which it is shown in Fig. 3, by a coil spring 78. The coil spring 78 has one end abutting a backing washer 79 which is prevented from axial movement in the direction away from the coil spring 78 by a snap ring 81 disposed in a groove in the drilled hole 72. A snap ring 82 fits into a groove in the drilled hole 72 to limit displacement of the piston valve 76 away from the coil spring 78. The washer 79 presents an opening in the inlet passage which is larger than the flow restricting orifice 77 formed in the piston valve 76.

The pump 26 may be driven by a vehicle engine and, therefore, its output will vary with the engine speed. For instance, the pump may have the capacity to deliver from 0 to 40 gallons per minute, in which case the orifice 77 and biasing spring 78 for piston valve 76 would be proportioned so that the piston valve would adjust to permit input fluid to enter the secondary passage 74 when the pump output reaches an intermediate rate such as 20 gallons per minute. When the pump output reaches an output of approximately 20 gallons per minute the pressure builds up on the input side of the orifice 77 to the point where the force due to the pressure differential across the orifice 77 exceeds the force exerted by the spring 78. The piston valve 76 moves from its seat compressing the spring when the beforementioned unbalanced state of forces exists and the input fluid flows into recess 73 thereby establishing fluid communication between the portion of the input passage 71 ahead of the orifice and the secondary passage 74.

A pressure relief valve 86 is provided to relieve the pump when the pressure differential across it exceeds 1000 pounds per square inch by allowing fluid to escape from the input passage 71 through escape passage 87. A centering spring 91 is provided to return the valve spool 32 to a neutral position, as shown in Fig. 3, from a shifted position in either direction when the operator releases the steering wheel 33. A cap member 92 encloses the coil spring 91 and is attached to the valve housing 39 by cap screws, not shown. A drilled hole 95 in the housing 39 establishes fluid communication between the exhaust passage 69 and the interior of cap member 92. Threaded plugs 96 and 97 are screwed into drilled and tapped holes 98 and 99, respectively.

As shown in Fig. 2 a cover 101 is secured to the housing 39 by four cap screws 102 and this cover catches fluid which may have escaped between the valve spool 32 and bore 43. The chamber inside the cover 101 is in fluid communication with exhaust passage 69 through drilled hole 100. A cap 103 is secured to the housing 39 by four cap screws 104 and this cap presents the input port 41 which is threaded to receive conduit 27.

Referring to Fig. 4, a bypass passage 106 is formed in the housing to communicate with the input passage 71 intermediate the spool valve 76 and the bore 43 at one end and to communicate at its other end with the secondary passage 74 through the recess 73. A spring loaded ball check valve 107 is interposed in the bypass passage 106. This check valve 107 includes a ball 108 biased by a coil spring 109 to a closed position. A cap 111 has a cylindrical portion 112 which holds the ball and spring in an operative position. Check valve 107 permits fluid flow from its secondary passage side to its input passage side when the pressure differential reaches a predetermined amount. Check valve 107 is a one way check valve preventing fluid from flowing from the input passage 71 to the secondary passage 74 through the bypass passage 106.

Referring to Figs. 5, 6 and 7, a motor supply or output passage 116 is formed in valve housing 39 so as to be in communication with recess 47 and has a threaded port 117 adapted to be connected to motor supply conduit 22. A second motor supply or output passage 118 is formed in valve housing 39 so as to be in communication with recess 49 and has a threaded port 119 adapted to be connected to motor supply conduit 23. A pair of cross relief valves 121, 122 are provided to allow fluid to pass from one end of the cylinder to the other through conduits 22, 23 when the pressure in one end of the cylinder of motor 21 exceeds the pressure in the other end by a predetermined amount. These cross check valves may be spring loaded to open, for instance, at a pressure differential of 1200 pounds per square inch. At such a setting the cross check valves will not open when the valve spool 32 is in a motor supplying position since check valve 86 opens at a lower pressure differential, 1000 pounds per square inch, as hereinbefore described. The cross check valves are provided to operate when the valve spool 32 is in a neutral position, as shown in Fig. 3, in which condition the motor supply passages 116, 118 are blocked at the bore by collars 66 and 67 of the valve spool.

The valve unit is of an open center type, that is, when the valve spool 32 is in a neutral position, as shown in Fig. 3, the pump is unloaded by virtue of the input fluid flowing freely through the bore at land 53 to the exhaust passage 69 and then to reservoir 29.

Figs. 8, 9, 10 and 11 schematically show the four motor supplying positions of the valve unit 14. In Fig. 8 the valve spool 32 has been adjusted to steer the wheels 16, shown in Fig. 1, to the right at slow speed, the motor 21 being contracted. Assuming the rate of pump delivery is over 20 gallons per minute, the fluid pressure builds up on the input side sufficiently to cause the piston valve 76 to compress the spring 78 and open the input passage 71 to the secondary passage 74 thereby bypassing a portion of the input fluid to the reservoir. The position of the valve spool 32 is such that land 53 and collar 67 cooperate to prevent escape of fluid from the input passage 71 to the exhaust passage through the bore 43 at that point. Output passage 116 is connected in fluid communication with the input passage through land 56 and recesses 47 and 48. Valve collar 66 blocks the flow of fluid from input passage 71 to output passage 118, the latter being in fluid communication with the exhaust passage 69 through land 58 and recesses 49 and 51. The fluid passing to the secondary passage 74 returns to the reservoir through exhaust passage 69 since it is not blocked at the bore. Check valve 107 prevents fluid flow in bypass passage 106 since the pressure at its secondary passage side is less than the pressure at its input passage side. In the adjusted position of the valve spool 32, shown in Fig. 8, only a slow speed fluid output can be effected regardless of the output of the pump 26. If the output of the pump 26 drops below 20 gallons per minute the piston valve 76 seats itself to seal off the secondary passage from the input passage and all the fluid supplied by the pump passes through the orifice 77 in the input passage 71.

In Fig. 9 the valve spool 32 has been moved to effect high speed steering to the right, the fluid motor 21 being contracted at a fast rate. The valve spool collar 64 now blocks the escape of fluid from the secondary passage 74 to the exhaust passage 69. With the pump output in excess of 20 gallons per minute the pressure builds up ahead of the orifice 77 in input passage 71 and in the secondary passage 74 to the extent that check valve 107 opens to allow input fluid to recombine with the fluid that has passed through the orifice 77. In this position of the valve spool 32, with the pump delivering over 20 gallons per minute, all the fluid delivered by the pump 26 is used to contract the motor 21 and thereby a high speed steering to the right is achieved.

In Fig. 10 the valve spool 32 has been adjusted to produce slow speed steering to the left by expansion of the motor or ram 21. The input passage 71 is blocked at the bore 43 by collar 68 from communication with exhaust passage 69. Fluid is free to flow from one end of the cylinder 21 to the reservoir by way of conduit 22, motor supply passage 116, recess 47, land 54 and recess 46. The opposite side of the ram 21 is supplied with fluid through conduit 23 which is in communication with input passage 71 through the open land 57. In the slow speed steering position to the left, as shown in Fig. 10, the valve spool 32 permits the secondary passage 74 to communicate with the exhaust passage 69 through open land 59. The piston valve 76 is shown open which would be its position when the pump 26 is delivering over 20 galllons per minute and since the secondary passage 74 is open to the exhaust passage 69 the bypassed input fluid returns to the reservoir. The limited quantity of fluid passing through orifice 77 in piston valve 76 produces a slow speed of expansion of steering motor 21. The check valve 107 will remain closed under the biasing action of its spring 109 since the fluid pressure in secondary passage 74 does not exceed the fluid pressure at the input passage side of the check valve.

In Fig. 11 the valve spool 32 has been moved downwardly an additional distance over that of Fig. 10 and in this condition high speed steering to the left is achieved. Again the pump 26 is delivering an excess of 20 gallons per minute and the piston valve 76 is adjusted so that fluid is bypassed from the input passage to the secondary passage 74. Since the secondary passage 74 is blocked at the bore by collar 66 the fluid pressure in the secondary passage 74 increases to the point where check ball 108 of the check valve 107 is displaced from its seat compressing spring 109 thereby permitting fluid to flow from the secondary passage through the bypass passage 106 to the input passage 71 intermediate the bore 43 and the orifice 77. Collar 68 prevents fluid communication between the input passage 71 and the exhaust passage 69, output passage 116 communicates with the reservoir and output passage 118 supplies total pump delivery of fluid under pressure to the ram 21 so as to expand the latter at a fast speed.

From the foregoing description it is evident that an improved multiple speed fluid directing valve unit has been provided wherein a pressure sensitive flow control means is provided in the input passage to restrict the amount of fluid flow at that point in the input passage and the same pressure sensitive flow control means permits bypassing of pressure fluid to the reservoir in the low speed adjusted position of the valve spool. When the valve spool is adjusted to a high speed motor supply position the bypassed fluid is recombined with the input fluid that flows through the pressure sensitive flow control means and thereby a second or faster speed of operation is effected in the hydraulically controlled device.

It should be understood that it is not intended to limit the invention to the particular forms and details described hereinabove and that the invention includes such other forms and modifications as are embraced by the scope of the appended claims.

It is claimed and desired to secure by Letters Patent:

1. A fluid directing valve unit comprising a valve housing presenting a valve spool receiving bore; input, exhaust and motor supply passages formed in said housing and in communication with said bore; a secondary passage extending between said input passage and said bore; pressure sensitive flow control means for blocking flow of fluid from said input passage to said secondary passage when the fluid pressure in said input passage is less than a predetermined amount and for permitting fluid to flow from said input passage to said secondary passage when the fluid pressure in said input passage exceeds said predetermined amount; a valve spool mounted in said bore for shifting from a neutral to low speed and high speed motor supplying positions, said secondary passage being open at the bore and in communication with said exhaust passage in said low speed position and closed at the bore in said high speed position; and means for establishing communication between said secondary passage and said input passage at a point between said flow control means and bore when said valve spool is in said high speed position.

2. A fluid directing valve unit comprising a valve housing presenting a valve spool receiving bore; input, exhaust and output passages formed in said housing and in communication with said bore; a secondary passage extending between said input passage and said bore; pressure sensitive flow control means for blocking flow of fluid from said input passage to said secondary passage when the fluid pressure in said input passage is less than a predetermined amount and for permitting fluid to flow from said input passage to said secondary passage when the fluid pressure in said input passage exceeds said predetermined amount; a valve spool mounted in said bore for shifting from a neutral to first and second fluid directing positions, said input passage being blocked from communication with said exhaust passage and in communication with said output passage when said valve spool is in its first and second fluid supplying positions, said secondary passage being open at the bore and in communication with said exhaust passage in said first position and closed at the bore in said second position of said valve spool; and a check valve for establishing communication between said secondary passage and said input passage at a point between said flow control means and bore when the fluid pressure on the secondary passage side of said check valve exceeds the fluid pressure on the input passage side of said check valve.

3. A fluid directing valve unit comprising a valve housing presenting a valve spool receiving bore; input, exhaust and output passages formed in said housing and in communication with said bore; a secondary passage extending between said input passage and said bore; a fluid flow restricting element in said input passage intermediate the connections of the latter with said secondary passage and said bore; pressure sensitive flow control means for blocking the flow of fluid from said input passage to said secondary passage when the fluid pressure at the inlet of said input passage is less than a predetermined amount and for permitting fluid to flow from said input passage to said secondary passage when the fluid pressure at the inlet of said input passage exceeds said predetermined amount; a valve spool mounted in said bore for shifting from a neutral to first and second fluid directing positions, said input passage being blocked from communication with said exhaust passage and in communication with said output passage when said valve spool is in its first and second fluid supplying positions, said secondary passage being open at the bore and in communication with said exhaust passage in said first position and closed at the bore in said second position of said valve spool, and a check valve for establishing communication between said secondary passage and said input passage intermediate the latter's connection with said bore and said restricting element when the fluid pressure on the secondary passage side of said check valve exceeds the fluid pressure on the input passage side of said check valve.

4. A fluid directing valve unit comprising a valve housing presenting a valve spool receiving bore; input, exhaust and motor supply passages formed in said housing and in communication with said bore; a secondary passage extending between said input passage and said bore; a pressure sensitive flow control valve member in said input passage presenting a permanently open orifice in said input passage; spring means urging said valve member toward a seated position in which said secondary passage is blocked from communication with said input passage, said valve member shifting to an adjusted position in which communication is established between said input and secondary passages when the resultant force produced by said spring means and the fluid pressure differential across said orifice exceeds a predetermined amount; a valve spool mounted in said bore for shifting from a neutral to low speed and high speed motor supplying positions, said secondary passage being open at the bore in said low speed position and closed at the bore in said high speed position, and means for establishing communication between said secondary passage and said motor supply passage when said valve spool is in said high speed position.

5. A fluid directing valve unit comprising a valve housing presenting a valve spool receiving bore; input, exhaust and motor supply passages formed in said housing and in communication with said bore; a secondary passage extending between said input passage and said bore; a pressure sensitive flow control valve member in said input passage presenting a permanently open orifice in said input passage; spring means urging said valve member toward a seated position in which said secondary passage is blocked from communication with said input passage, said valve member shifting to an adjusted position in which communication is established between said input and secondary passages when the resultant force produced by said spring means and the fluid pressure differential across said orifice exceeds a predetermined amount; a one way check valve operatively interposed between said secondary passage and said input passage intermediate said valve member and said bore permitting flow of fluid from said secondary passage to said input passage when the fluid pressure on the secondary passage side of said check valve exceeds the fluid pressure on the input passage side of said check valve; and a valve spool mounted in said bore for shifting from a neutral to low speed and high speed motor supplying positions, said secondary passage being open at the bore in said low speed position and closed at the bore in said high speed position.

6. A fluid directing valve unit comprising a valve housing presenting a valve spool receiving bore; input, exhaust and motor supply passages formed in said housing and in communication with said bore; a secondary passage extending between said input passage and said bore; a pressure sensitive flow control valve member in said input passage presenting a permanently open orifice in said input passage; spring means urging said valve member toward a seated position in which said secondary passage is blocked from communication with said input passage, said valve member shifting to an adjusted position in which communication is established between said input and secondary passages when the resultant force produced by said spring means and the fluid pressure differential across said orifice exceeds a predetermined amount; a one way check valve operatively interposed between said secondary passage and said input passage intermediate said valve member and bore permitting flow of fluid from said secondary passage to said input passage when the fluid pressure on the secondary passage side of said check valve exceeds the fluid pressure on the input passage side of said check valve; and a valve spool mounted in said bore for shifting from a neutral to low speed and high speed motor supplying positions, said motor supply passage being blocked at said bore and said input and secondary passages being open to the exhaust passage through said bore when said valve spool is in its neutral position, said motor supply passage being in communication with said input passage through said bore and said input passage being blocked by said valve spool from communication with said exhaust passage when said valve spool is in said low and high speed motor supplying positions, said secondary passage being in communication with said exhaust passage through said bore in said low speed motor supplying position of said valve spool and blocked by said valve spool from communication with said exhaust passage in said high speed motor supplying position of said valve spool.

7. In a fluid control system for operating a fluid motor at two speeds, a valve mechanism comprising a valve housing having a bore for receiving a valve element; an input passage extending from said bore to an input port; a pair of output passages in said housing connected, respectively, with motor supply ports and communicating with said bore at spaced points of the latter; an exhaust passage formed in said housing in communication with said bore and an exhaust port; a secondary passage extending between said input passage and said exhaust passage and intermediately intersecting said bore; a pressure sensitive valve reciprocably mounted in said input passage; spring means urging said pressure sensitive valve toward a closed position in which said secondary passage is blocked at the input passage; means defining an opening in said pressure sensitive valve so as to present a permanently open orifice in said input passage; said pressure sensitive valve shifting to an adjusted position in which said input and secondary passages are in communication when the resultant force produced by said spring and the fluid pressure differential across said orifice exceeds a predetermined amount; a bypass passage connecting said secondary passage with said input passage at a portion of the latter between said bore and pressure sensitive valve; check means in said bypass passage permitting fluid flow therethrough from said secondary passage when fluid pressure on the secondary passage side of said check means exceeds the fluid pressure on the input passage side of said check means by a predetermined amount; and a valve element shiftably mounted in said bore having a plurality of flow blocking portions and a plurality of communication establishing portions, said valve element being selectively shiftable from a neutral position in which said output passages are blocked at said bore to slow speed and fast speed positions; said input passage being blocked at said bore from communication with said exhaust passage and said output passages being in communication with said input and exhaust passages, respectively, when said valve element is in said slow and fast speed positions; said secondary passage being open and blocked, respectively, when said valve element is in said slow and fast speed positions.

References Cited in the file of this patent

UNITED STATES PATENTS

| | | |
|---|---|---|
| 2,363,179 | Harrington et al. | Nov. 21, 1944 |
| 2,625,177 | Ziskal | Jan. 13, 1953 |
| 2,649,107 | Avery | Aug. 18, 1953 |
| 2,649,688 | Slomer | Aug. 25, 1953 |
| 2,734,589 | Groen | Feb. 14, 1956 |
| 2,755,624 | Klessig et al. | July 24, 1956 |